United States Patent
Woo et al.

(10) Patent No.: US 11,490,285 B2
(45) Date of Patent: Nov. 1, 2022

(54) SERVER AND METHOD OF CONTROLLING THE SAME

(71) Applicants: Hyundai Motor Company, Seoul (KR); Kia Motors Corporation, Seoul (KR)

(72) Inventors: Seunghyun Woo, Seoul (KR); Minjae Park, Gyeonggi-do (KR); Jong Bok Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 36 days.

(21) Appl. No.: 17/024,881

(22) Filed: Sep. 18, 2020

(65) Prior Publication Data

US 2021/0289387 A1   Sep. 16, 2021

(30) Foreign Application Priority Data

Mar. 10, 2020 (KR) .................. 10-2020-0029417

(51) Int. Cl.
*H04W 4/021* (2018.01)
*H04W 28/02* (2009.01)
*G06V 40/16* (2022.01)

(52) U.S. Cl.
CPC ....... *H04W 28/0226* (2013.01); *H04W 4/022* (2013.01); *G06V 40/174* (2022.01)

(58) Field of Classification Search
CPC . H04W 28/00; H04W 28/0226; H04W 4/022; H04W 4/02; G06K 9/00302; G06K 9/00335
See application file for complete search history.

(56) References Cited

U.S. PATENT DOCUMENTS

| | | | |
|---|---|---|---|
| 9,805,601 B1 * | 10/2017 | Fields | B60T 17/22 |
| 2006/0104229 A1 * | 5/2006 | Vannithamby | H04W 72/082 370/328 |
| 2019/0018859 A1 * | 1/2019 | Miyaoka | G06F 16/29 |
| 2021/0055122 A1 * | 2/2021 | Pham | G08G 1/096838 |
| 2021/0080966 A1 * | 3/2021 | Tran | B60W 30/18163 |
| 2021/0247196 A1 * | 8/2021 | Wells | G01C 21/3461 |

FOREIGN PATENT DOCUMENTS

CN 110998687 A * 4/2020 ............ G08G 1/01

* cited by examiner

*Primary Examiner* — Jinsong Hu
*Assistant Examiner* — Farideh Madani
(74) *Attorney, Agent, or Firm* — Fox Rothschild LLP

(57) ABSTRACT

A server is provided for determining a congestion level of a travel area and pedestrian's emotion in the travel area based on image data received from a personal mobility; A service area is adjusted based on the determined congestion level and the pedestrian's emotion. The server includes a communicator and a controller that determines a number of pedestrians detected for a preset time based on image data received from a personal mobility. The controller further determines a congestion level of an area on which the personal mobility is traveling based on the number of pedestrians and an average speed of the personal mobility and adjusts a service area for the personal mobility based on the congestion level.

16 Claims, 10 Drawing Sheets

| EXPRESSION \ EMOTION | Disgust | Anger | Fear | Anxiety | Sadness | Stress | Frustration | Boredom | Neutral | Interest | Distress | Platonic Love | Romantic Love | Pleasure | Joy |
|---|---|---|---|---|---|---|---|---|---|---|---|---|---|---|---|
| EXPRESSION 1 | .875 | .775 | .653 | .353 | .545 | | | | .655 | .545 | | | | | .353 |
| EXPRESSION 2 | .555 | 0.864 | .878 | | .545 | | .464 | .477 | .577 | | | | .353 ← 400 | | |
| EXPRESSION 3 | .545 | | .645 | | .545 | 0.817 | | | | | | | | | |

SERVER AND METHOD OF CONTROLLING THE SAME

CROSS-REFERENCE TO RELATED APPLICATION

This application is based on and claims priority under 35 U.S.C. § 119 to Korean Patent Application No. 10-2020-0029417, filed on Mar. 10, 2020, the disclosure of which is incorporated herein by reference.

BACKGROUND

1. Field of the Disclosure

The disclosure relates to a server for controlling a service area of personal mobility and a method of controlling the same.

2. Description of the Related Art

Recently, with an increase in the market for personal mobility, which is an electricity-driven single person transportation device, the number of people using a personal mobility is gradually increasing. In addition, a personal mobility operator provides a service for renting and returning a personal mobility within a certain service area, and sets the service area in consideration of the demand for personal mobility, relocation of personal mobility, and the like.

Accordingly, the personal mobility operator may set the service area using a geo-fence, which is a virtual perimeter, and when the personal mobility deviates from the service area, limit the function of the personal mobility based on a global positioning system (GPS).

SUMMARY

Therefore, it is an object of the disclosure to provide a server configured to determine a congestion level of a driving area and an emotion of a pedestrian in the driving area based on image data received from a personal mobility and adjusting a service area based on the congestion level and the emotion of the pedestrian, and a method of controlling the same. Additional aspects of the disclosure will be set forth in part in the description which follows and, in part, will be obvious from the description, or may be learned by practice of the disclosure.

It is an aspect of the disclosure to provide a server that may include: a communicator; and a controller configured to determine a number of pedestrians detected for a preset time based on image data received from a personal mobility, determine a congestion level of an area on which the personal mobility is traveling based on the number of pedestrians and an average speed of the personal mobility, and adjust a service area for the personal mobility based on the congestion level. The controller may be configured to reduce a boundary of the service area such that the area on which the personal mobility is traveling is deleted from the service area when the congestion level is greater than or equal to a preset reference value.

The controller may be configured to expand a boundary of the service area such that the area on which the personal mobility is traveling is included in the service area when the congestion level is less than a preset reference value. The controller may be configured to determine emotion information of the pedestrian in the area on which the personal mobility is traveling based on the image data. Additionally, the controller may be configured to reduce a boundary of the service area such that the area on which the personal mobility is traveling is deleted from the service area when the congestion level is less than a preset reference value and a first proportion or more of the pedestrians are determined to have a negative emotion based on the emotion information.

The controller may be configured to expand a boundary of the service area such that the area on which the personal mobility is traveling is included in the service area when the congestion level is greater than a preset reference value and a second proportion or more of the pedestrians are determined to have a positive emotion based on the emotion information. The controller may be configured to set the area travelled on by the personal mobility as a recommend return area when the area on the personal mobility is traveling has been previously included in the service area.

Further, the controller may be configured to set the area on which the personal mobility is traveling as at least one of a return prohibited area or a travel prohibited area when the congestion level is greater than a preset reference value and a third proportion or more of the pedestrians are determined to have a negative emotion based on the emotion information. The controller may be configured to determine the emotion information based on a facial expression of the pedestrian of the image data.

The server may further include a display and the controller may be configured to determine recommended information related to the service area based on the congestion level and the emotion information, and operate the display to display the recommendation information. The server may further include an inputter configured to receive an input from a user. The controller may be configured to adjust the service area based on the recommendation information upon receipt of an approval of the recommendation information that is input from the user.

Another aspect of the disclosure provides a method of controlling a server including a communicator, the method may include: determining a number of pedestrians detected for a preset time based on image data received from a personal mobility; determining a congestion level of an area on which the personal mobility is traveling based on the number of pedestrians and an average speed of the personal mobility; and adjusting a service area for the personal mobility based on the congestion level.

The adjusting of the service area may include reducing a boundary of the service area such that the area on which the personal mobility is traveling is deleted from the service area when the congestion level is greater than or equal to a preset reference value. The adjusting of the service area may include expanding a boundary of the service area such that the area on which the personal mobility is traveling is included in the service area when the congestion level is less than a preset reference value.

The method may further include determining emotion information of the pedestrian in the area on which the personal mobility is traveling based on the image data. The adjusting of the service area may include reducing a boundary of the service area such that the area on which the personal mobility is traveling is deleted from the service area when the congestion level is less than a preset reference value and a first proportion or more of the pedestrians are determined to have a negative emotion based on the emotion information.

The adjusting of the service area may include expanding a boundary of the service area such that the area on which the personal mobility is traveling is included in the service area when the congestion level is greater than a preset reference value and a second proportion or more of the pedestrians are determined to have a positive emotion based on the emotion information. The adjusting of the service area may include setting the area on which the personal mobility is traveling as a recommended return area when the area on which the personal mobility is traveling has been previously included in the service area. The adjusting of the service area may include setting the area on which the personal mobility is traveling as at least one of a return prohibited area or a travel prohibited area when the congestion level is greater than a preset reference value and a third proportion or more of the pedestrians are determined to have a negative emotion based on the emotion information.

The determining of the emotion information may include determining the emotion information based on a facial expression of the pedestrian of the image data. The server may further include a display, and the method may further include determining recommended information related to the service area based on the congestion level and the emotion information, and operating the display to display the recommendation information. The server may further include an inputter configured to receive an input from a user, and the method may further include adjusting the service area based on the recommendation information upon receipt of an approval of the recommendation information that is input from the user.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network. It will be further understood that the terms "comprises" and/or "comprising," when used in this specification, specify the presence of stated features, integers, steps, operations, elements, and/or components, but do not preclude the presence or addition of one or more other features, integers, steps, operations, elements, As used herein, the singular forms "a," "an" and "the" are intended to include the plural forms as well, unless the context clearly indicates otherwise.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

It will be further understood that the term "connect" or its derivatives refer both to direct and indirect connection, and the indirect connection includes a connection over a wireless communication network. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

As used herein, the singular forms "a," "an" and "the" are intended to include the plural forms as well, unless the context clearly indicates otherwise. The terms, such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), software stored in memories, or processors. Reference numerals used for method operations are just used to distinguish each operation, but not to limit an order of the operations. Thus, unless the context clearly dictates otherwise, the written order may be practiced otherwise.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
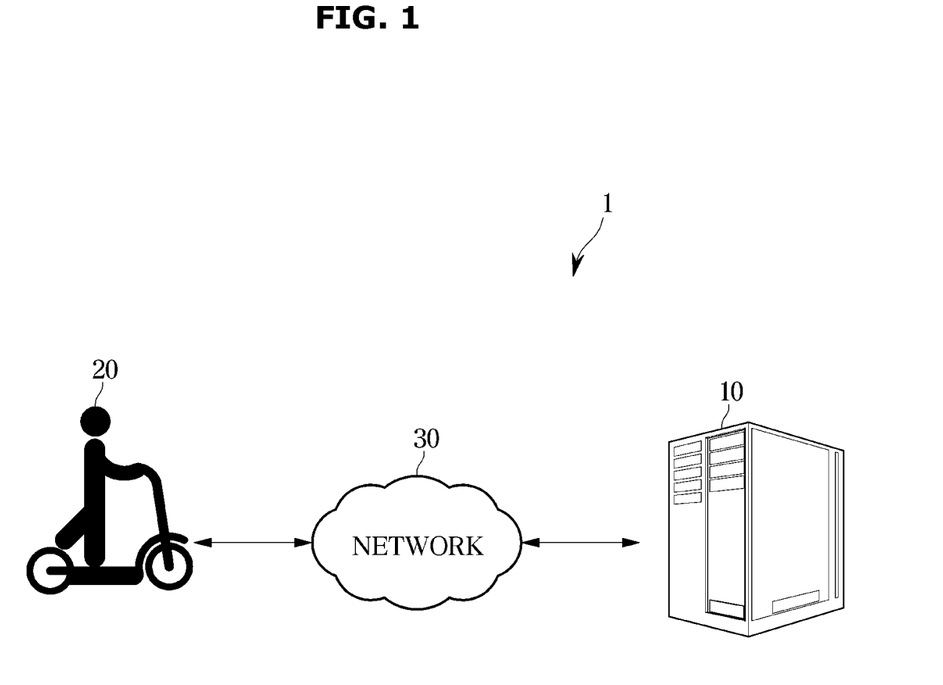
FIG. 1 is a block diagram illustrating a configuration of a service area adjustment system including a personal mobility and a server according to an exemplary embodiment of the disclosure.

Hereinafter, a server and a method of controlling the same will be described with reference to the accompanying drawings. FIG. 1 is a block diagram illustrating a configuration of a service area adjustment system 1 including a personal mobility and a server according to an exemplary embodiment of the disclosure. Referring to FIG. 1, the service area adjustment system 1 according to the exemplary embodiment may include a server 10, a personal mobility 20, and a network 30.

The server 10 according to the exemplary embodiment of the disclosure may be configured to determine a congestion level in an area on which the personal mobility 20 is traveling and emotion information of pedestrians in the area on which the personal mobility 20 is traveling based on image data received from the personal mobility 20, and based on the congestion level and the emotion information determined as the above, adjust a service area of the personal mobility 20. Accordingly, the server 10 may be configured to perform wireless communication with the personal mobility 20 via the network 30. The server 10 may be configured to communicate with the network 30 in a wired or wireless manner. In particular, the wired communication and wireless communication may be provided using generally known communication technique.

The personal mobility 20 according to the exemplary embodiment, which is a single-person transportation device powered by electricity, may include a power wheel, an electric kickboard, an electric bicycle, an ultra-compact electric vehicle, and the like. The type of the personal mobility 20 is not limited to the above example and may be variously provided as long as it is capable of serving as a single-person transportation device that operates on electricity. The personal mobility 20 according to the exemplary embodiment may be configured to perform wireless communication with the server 10 via the network 30 and transmit image data to the server 10.

The network 30 according to the exemplary embodiment may support communication between the server 10 and the personal mobility 20, and may include at least one of a telecommunication network, for example, a computer network (e.g., local area network (LAN) or wide area network (WAN)), the Internet, or a telephony network. However, the type of the network 30 is not limited to the above example, and may be variously provided as long as it is capable of supporting communication.

Figure 2:
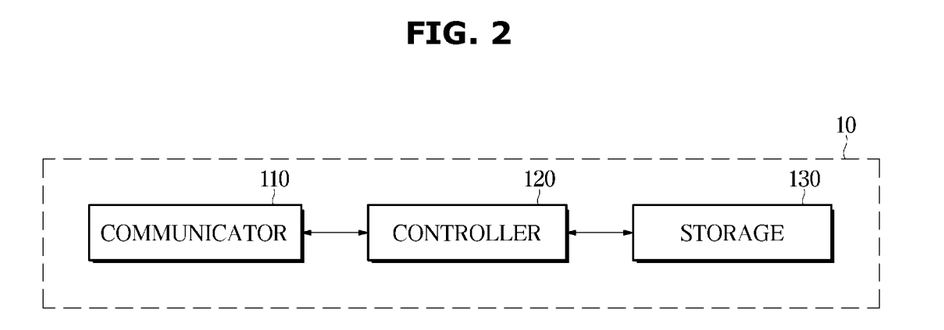
FIG. 2 is a control block diagram illustrating a server according to an exemplary embodiment of the disclosure.

FIG. 2 is a control block diagram illustrating the server 10 according to an exemplary embodiment of the disclosure. Referring to FIG. 2, the server 10 may include a communicator 110 configured to communicate with the personal mobility 20 via the network 30, a controller 120 configured to process image data received from the personal mobility 20, and adjust a service area of the personal mobility 20 based on the processed image data, and a storage 130 configured to store various pieces of information required for the operation of the server 10 therein.

The communicator 110 according to the exemplary embodiment may be connected to the network 30 in a wired or wireless manner to transmit and receive data to/from the personal mobility 20. For example, the communicator 110 may be configured to receive image data from the personal mobility 20. The controller 120 may be configured to determine a congestion level of an area on which the personal mobility 20 is traveling and emotion information of pedestrians in the area on which the personal mobility 20 is traveling based on the image data received from the personal mobility 20 through the communicator 110. In other words, the controller 120 may be configured to determine the congestion level and the emotion information of pedestrians in the area on which the personal mobility 20 is traveling based on image processing on the image data received from the personal mobility 20.

In particular, the image data may include a captured image of a front of the personal mobility 20 and may be acquired using a camera provided in the personal mobility 20. The controller 120 according to an exemplary embodiment may be configured to determine the congestion level and the emotion information of pedestrians at a preset time interval. In other words, the controller 120 may be configured to determine the congestion level and the emotion information of pedestrians based on image data corresponding to a predetermined time period. The controller 120 may be configured to determine the congestion level based on the number of pedestrians detected during the preset time period based on the image data and an average speed of the personal mobility 20 in the preset time period.

In particular, the controller 120 may be configured to detect pedestrians in the image data by processing the image data based on generally known image processing algorithms (e.g., edge detection, etc.), and may be configured to determine the congestion level that corresponds to the number of pedestrian per unit time by dividing the number of pedestrians detected during the preset time period by the average speed in the preset time period. For example, the controller 120 may be configured to detect one hundred fifty pedestrians for ten minutes, and divide the detected number of pedestrian (one hundred fifty) by 3 km/h that is the average speed of the person mobility 20 for ten minutes, thereby determining a congestion level of "50".

In addition, the controller 120 according to an exemplary embodiment may be configured to analyze a facial expression of a pedestrian in the image data by processing the image data based on generally known image processing algorithms, and may be configured to determine emotion information that represents an emotion state of the pedestrian based on the analyzed facial expression. In particular, the controller 120 may be configured to detect a facial expression of a pedestrian based on image data related to the pedestrian, and obtain emotion information corresponding to the detected facial expression. The construction of acquiring the emotion information of the pedestrian based on image data will be described in detail below.

The controller 120 may be configured to adjust a service area for the personal mobility 20 based on the congestion level and the emotion information of the pedestrian. In particular, the service area may correspond to an area in which services, such as rental and return of the personal mobility 20, are provided, and may be defined by a geofence that is a virtual perimeter. In response to the server 10 determining that the personal mobility 20 deviates from the service area based on a global positioning system (GPS), the server 10 may be configured to limit functions of the personal mobility 20. For example, the server 10 may be configured to limit functions of the personal mobility 20 existing outside the service area, for example, by limiting the return of the personal mobility 20 or the speed of the personal mobility 20.

The controller 120 may be configured to reduce the boundary of the service area such that the area on which the personal mobility 20 is traveling is deleted from the service area when the congestion level is less than a preset reference value and a first proportion or more of the pedestrians are determined to have a negative emotion based on the emotion information. In addition, the controller may be configured to expand the boundary of the service area such that the area on which the personal mobility 20 is traveling is included in the service area when the congestion level is greater than the preset reference value and a second proportion or more of the pedestrians are determined to have a positive emotion based on the emotion information.

Particularly, the controller 120 may be configured to set the area on which the personal mobility 20 is traveling as a recommended return area when the area on which the personal mobility 20 is traveling has been previously included in the service area. The controller 120 may be configured to update an application that provides a service based on location information of a recommended return area such that the location information of the recommended return area is provided to users of the personal mobility 20. When the personal mobility 20 is returned to the recommended return area, the controller 120 may be configured to provide a preset reward (e.g., points, etc.) to a user account corresponding to the user of the personal mobility 20.

Additionally, the controller 120 may be configured to set the area on which the personal mobility 20 is traveling as at least one of a return prohibited area or a travel prohibited area when the congestion level is greater than the preset reference value and a third proportion or more of the pedestrians are determined to have a negative emotion based on the emotion information. In particular, the controller 120 may be configured to update an application that provides a service based on location information of a return prohibited area or a travel prohibited area such that the location information of the return prohibited area or the travel prohibited area is provided to users of the personal mobility 20, and may be configured to limit the return of the personal mobility 20 or the speed of the personal mobility 20 in the corresponding area. In other words, the controller 120 may be configured to limit the return or speed of the personal mobility 20 that has entered the corresponding area based on a GPS signal.

The controller 120 may be configured to determine recommendation information for the service area based on the congestion level and the emotion information, and may be configured to operate a display (not shown) to display the recommendation information. Accordingly, the server 10 may further include the display, and the display may employ a display panel as generally known in the art.

Particularly, the recommendation information may include information for recommending adjustment of the existing service area, and may include recommendation content for deleting or including an area on which the personal mobility 20 is traveling from or into the service area. In addition, according to an exemplary embodiment, the recommendation information may include content for recommending an area on which the personal mobility 20 is traveling as at least one of a recommended return area, a return prohibited area, or a travel prohibited area.

The recommendation information according to an exemplary embodiment may display the recommendation content as text, or display the recommendation content visually on a map. However, the display format of the recommendation information is not limited thereto, and may be variously provided as long as it is capable of displaying the recommendation content to the user of the server 10. The controller 120 may be configured to adjust the service area based on the recommendation information in response to receiving an approval for the recommendation information via an inputter (not shown) from a user. Accordingly, the server 10 may include the inputter configured to receive a user's input, and the inputter may be provided using various input devices generally known in the art.

The controller 120 according to the exemplary embodiment may be configured to operate the personal mobility 20 based on the adjusted service area. In particular, in response to determining that the personal mobility 20 deviates from the service area based on a GPS signal, the controller 120 may be configured to limit some functions of the personal mobility 20 such that the personal mobility 20 operates within the service area. For example, the controller 120 may be configured to limit the return of the personal mobility 20 or the speed of the personal mobility 20.

The controller 120 according to the exemplary embodiment may be configured to adjust the service area for the personal mobility 20 by only considering the congestion level. In other words, the controller 120 may be configured to determine the number of pedestrians detected for a preset time based on image data received from the personal mobility 20, determine a congestion level in an area on which the personal mobility is traveling based on the number of pedestrians and an average speed of the personal mobility 20, and adjust the service area of the personal mobility 20 based on the congestion level.

In particular, the controller 120 may reduce the boundary of the service area such that the area on which the personal mobility 20 is traveling is deleted from the service area when the congestion level is greater than or equal to a preset reference value. In addition, the controller 120 may be configured to expand the boundary of the service area such that the area on which the personal mobility 20 is traveling is included in the service area when the congestion level is less than the preset reference value. The controller 120 may include at least one memory configured to store programs for performing the above described operations and operations described below, and at least one processor for executing the stored programs.

When the memory and the processor are plural, the plurality of memories and processors may be integrated into one chip, or may be provided at separate locations. The storage 130 according to the exemplary embodiment may store image data collected by the communicator 110, correlation information between facial expressions and emotion factors of pedestrians, emotion information of pedestrians, and the congestion. The data stored in the storage 130 may be transmitted to the controller 120. Accordingly, the storage 130 may include storage media generally known in the art.

The server 10 according to the exemplary embodiment may be configured to receive a congestion level of an area on which the personal mobility 20 is traveling and emotion information of pedestrians in the area on which the personal mobility 20 is traveling from the personal mobility 20, and adjust the service area of the personal mobility 20 based on the received congestion level and the received emotion information. In other words, the server 10 may be configured to directly receive the congestion level and the emotion information from the personal mobility 20 rather than obtaining the congestion level and the emotion information by receiving image data from the personal mobility 20 and processing the received data. In particular, the personal mobility 20 may be configured to obtain the congestion level and the emotion information of the area on which the personal mobility 20 is traveling by processing image data based on generally known image processing algorithms.

Figure 3:
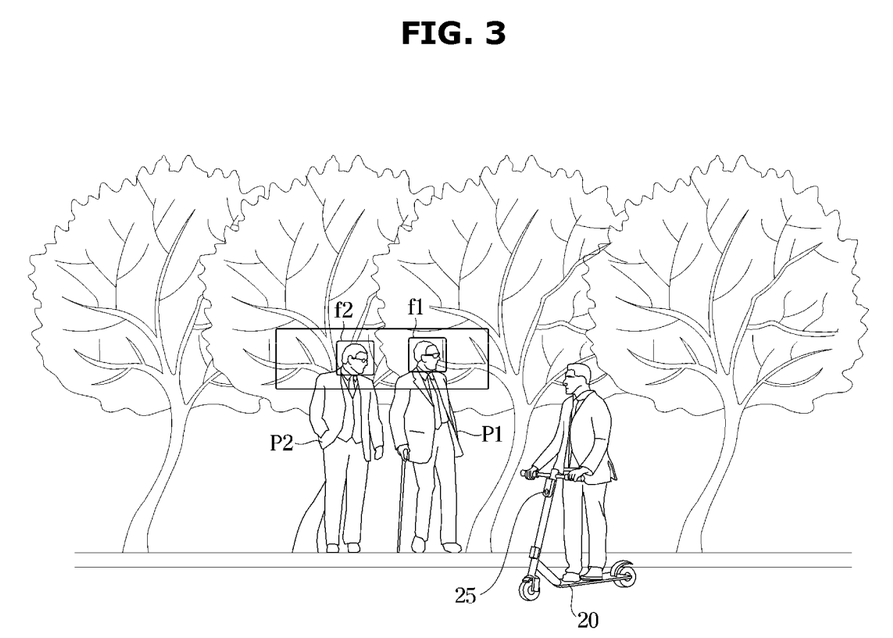
FIG. 3 is a diagram illustrating a case in which a server processes image data received from a personal mobility according to an exemplary embodiment of the disclosure.
Figure 4:
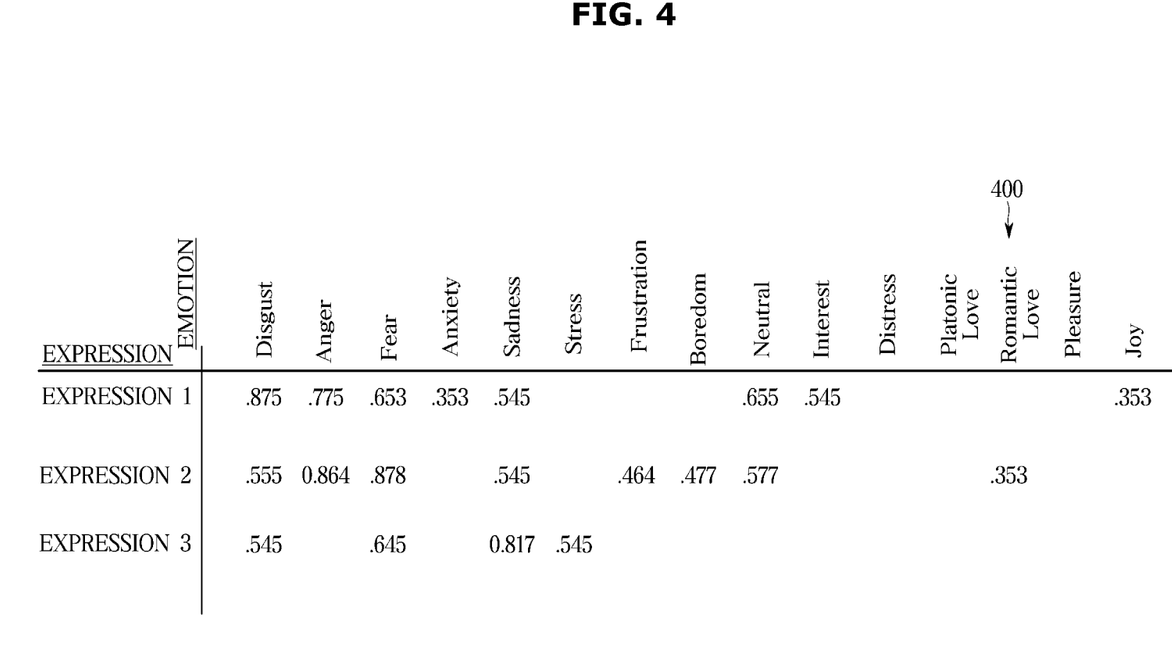
FIG. 4 is a diagram illustrating an emotion classification criterion of a server according to an exemplary embodiment of the disclosure.

FIG. 3 is a diagram illustrating a case in which the server 10 processes image data received from the personal mobility 20 according to an exemplary embodiment of the disclosure, and FIG. 4 is a diagram illustrating an emotion classification criterion of the server 10 according to an exemplary embodiment of the disclosure. Referring to FIG. 3, the personal mobility 20 according to the exemplary embodiment may include a camera 25 configured to capture an image of the front, and may be configured to acquire image data including pedestrians p1 and p2 positioned in front of the personal mobility 20 using the camera 25. The image data may include faces f1 and f2 of the pedestrians p1 and p2.

The server 10 according to the exemplary embodiment may be configured to receive image data from the personal mobility 20 via the communicator 110, determine the congestion level of an area on which the personal mobility 20 is traveling by detecting the pedestrians p1 and p2 based on image processing on the image data, and determine emotion information of the pedestrians p1 and p2 in the area on which the personal mobility 20 is traveling based on image processing on the faces f1 and f2.

In particular, the controller 120 according to an exemplary embodiment may be configured to determine the congestion level based on the number of pedestrians detected during a preset time based on the image data and the average speed of the personal mobility 20 in the preset time. The controller 120 may be configured to detect the pedestrians (p1, p2, etc.) in the image data by processing the image data based on a general known image processing algorithm (e.g., edge detection, etc.), and determine the congestion level corresponding to the number of pedestrians per unit speed by dividing the number of pedestrian detected during a preset time by the average speed in the preset time.

In addition, the controller 120 may be configured to analyze the facial expressions of the faces (f1, f2, etc.) in the image data by processing the image data based on a generally known image processing algorithm, and determine emotion information indicating the emotional state of the pedestrian (p1, p2, etc.) based on the facial expressions. In particular, the controller 120 may be configured to detect a facial expression of a pedestrian based on the image data of the pedestrian, and obtain emotion information corresponding to the detected facial expression.

The controller 120 may be configured to obtain emotion information for each pedestrian by applying a facial action coding system (FACS) to each facial expression of the pedestrian. In particular, the controller 120 may be configured to extract feature points from a face of a pedestrian, and extract a plurality of face elements using the extracted feature points. The plurality of face elements may include eyebrows, eyes, a nose, and a mouth. The controller 120 may be configured to combine patterns of the respective extracted face elements, and compare the combined pattern with correlation information 400 between a facial expression and an emotion factor stored in the storage 130. The correlation information 400 between the facial expression and the emotion factor represents information indicating the relationship between the facial expression and the emotion.

Referring to FIG. 4, the controller 120 may be configured to determine, as the facial expression of the pedestrian, a face expression in the correlation information 400 between the facial expression and the emotion factor that corresponds to the same or the most similar pattern as the combined pattern of the pedestrian. In addition, the controller 120 may be configured to obtain emotion information indicating the emotion of the pedestrian by considering a correlation value in the correlation information 400 between the facial expression and the emotion factor that corresponds to the determined facial expression of the pedestrian.

For example, when the determined facial expression of the pedestrian is facial expression 2 on the correlation information 400 between the facial expression and the emotion factor, the controller 120 may be configured to obtain emotion information indicating that an emotion of pleasure having the highest correlation value is the emotion of the pedestrian. Although the correlation information 400 between the facial expression and the emotion factor in FIG. 4 shows only facial expression 1, facial expression 2, and facial expression 3, any facial expression capable of classifying pedestrian emotions may be included in the correlation information without limitation.

As described above, the controller 120 may be configured to determine the facial expression for each pedestrian by analyzing image data in an area on which the personal mobility 20 is traveling acquired by the camera 25 of the personal mobility 20, and obtain emotion information for each pedestrian based on the determined facial expression. In particular, the obtained emotion information may be defined as a numerical value for each of a positivity level, a negativity level, and an excitement level according to the degree of the emotion based on Russell's emotion model.

Figure 5:
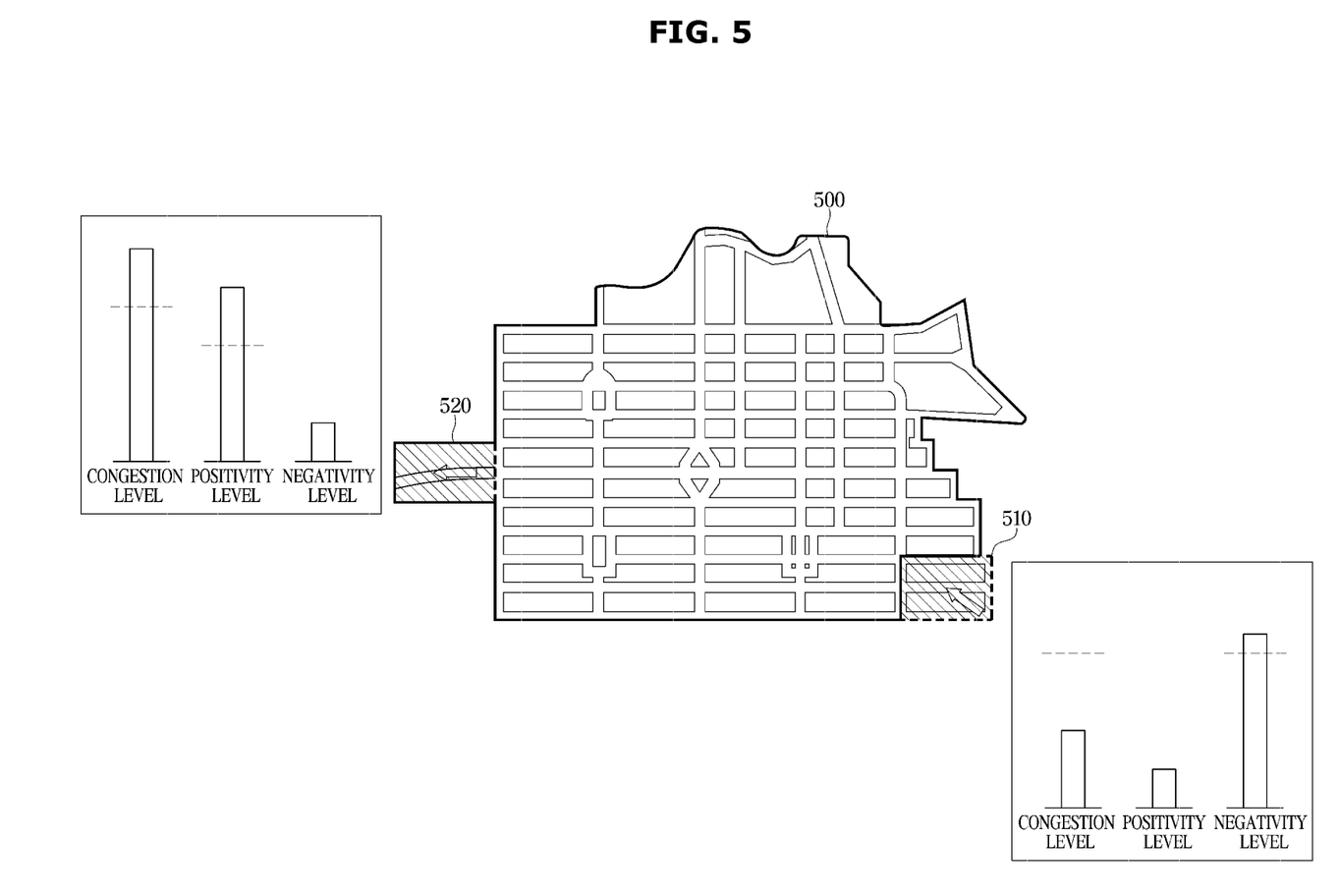
FIG. 5 is a diagram illustrating a case in which a server expands or reduces a service area according to an exemplary embodiment of the disclosure.
Figure 6:
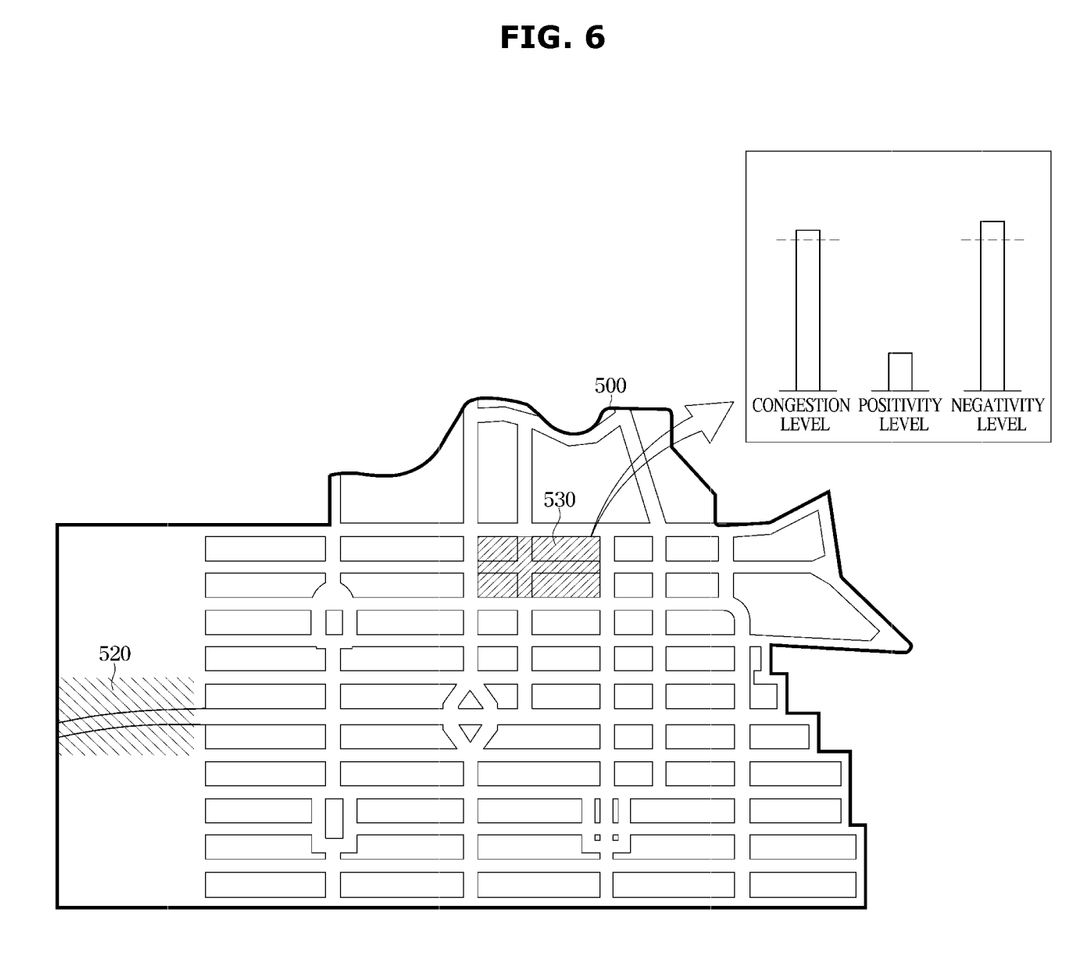
FIG. 6 is a diagram illustrating a case in which a server determines a recommended return area or a return prohibited area according to an exemplary embodiment of the disclosure.

FIG. 5 is a diagram illustrating a case in which the server 10 expands or reduces a service area according to an exemplary embodiment of the disclosure, and FIG. 6 is a diagram illustrating a case in which the server 10 determines a recommended return area or a return prohibited area according to an exemplary embodiment of the disclosure. Referring to FIG. 5, the controller 120 may be configured to adjust a service area 500 for the personal mobility 20 based on the congestion level and the emotion information of the pedestrian.

Particularly, the service area 500 may correspond to an area in which services, such as rental and return of the personal mobility 20, are provided, and may be defined by a geo-fence that is a virtual perimeter. When the server 10 determines that the personal mobility 20 deviates from the service area 500 based on a global positioning system (GPS), the server 10 may be configured to limit the functions of the personal mobility 20. For example, the server 10 may be configured to limit the functions of the personal mobility 20 existing outside the service area 500, for example, by limiting the return of the personal mobility 20 or the speed of the personal mobility 20.

The controller 120 may be configured to reduce the boundary of the service area 500 such that an area 510 on which the personal mobility 20 is traveling is deleted from the service area 500 when the congestion level is less than a preset reference value and a first proportion or more of the pedestrians are determined to have a negative emotion based on the emotion information. The controller 120 may reduce be configured to the boundary of the service area 500 such that the area 510 on which the personal mobility 20 is traveling is deleted from the service area 500 when the area 510 on which the personal mobility 20 is traveling is within a preset distance (e.g., about 50 m) from the boundary of the service area 500.

In addition, the controller 120 may be configured to expand the boundary of the service area 500 such that an area 520 on which the personal mobility 200 is traveling is included in the service area 500 when the congestion level is greater than the preset reference value and a second proportion or more of the pedestrians are determined to have a positive emotion based on the emotion information. Particularly, the controller 120 according to an exemplary embodiment may be configured to expand the boundary of the service area 500 such that the area 520 on which the personal mobility 20 is traveling is included in the service area 500 when the area 520 on which the personal mobility 20 is traveling is within a preset distance (e.g., about 50 m) from the boundary of the service area 500.

When the area 520 on which the personal mobility 20 is traveling has been previously included in the service area as shown in FIG. 6, the controller 120 may be configured to determine the area 520 on which the personal mobility 20 is traveling as a recommended return area. In addition, the controller 120 may be configured to update an application that provides a service based on location information of a recommended return area such that the location information of the recommended return area is provided to users of the personal mobility 20, and when the personal mobility 20 is returned to the recommended return area, may provide a preset reward (e.g., points, etc.) to a user account corresponding to the user of the personal mobility 20.

The controller 120 may be configured to set an area 530 on which the personal mobility 20 is traveling as at least one of a return prohibited area or a travel prohibited area when the congestion level is greater than the preset reference value and a third proportion or more of the pedestrians are determined to have a negative emotion based on the emotion information.

In particular, the controller 120 may be configured to update an application that provides a service based on location information of a return prohibited area or a travel prohibited area such that the location information of the return prohibited area or the travel prohibited area is provided to users of the personal mobility 20, and limit the return of the personal mobility 20 or the speed of the personal mobility 20 in the corresponding area. In other words, the controller 120 may be configured to limit the return or speed of the personal mobility 20 that has entered the corresponding area based on a GPS signal. The controller 120 may be configured to operate the personal mobility 20 based on the adjusted service area. In particular, in response to determining that the personal mobility 20 deviates from the service area based on a GPS signal, the controller 120 may be configured to limit some functions of the personal mobility 20 such that the personal mobility 20 operates within the service area. For example, the controller 120 may be configured to limit the return of the personal mobility 20 or the speed of the personal mobility 20.

Figure 7A:
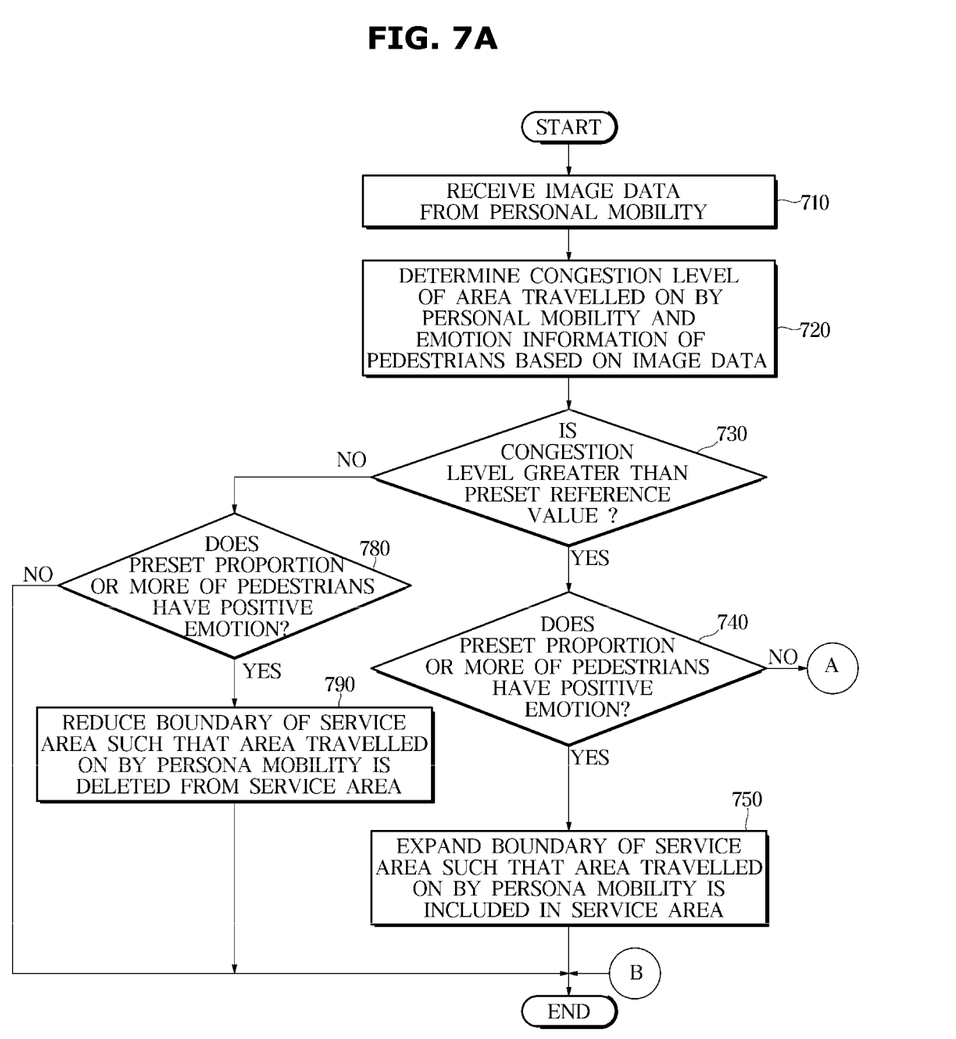
FIG. 7A and FIG. 7B are a flowchart showing a method of controlling a server according to an exemplary embodiment of the disclosure, which shows an operation of adjusting a service area.
Figure 7B:
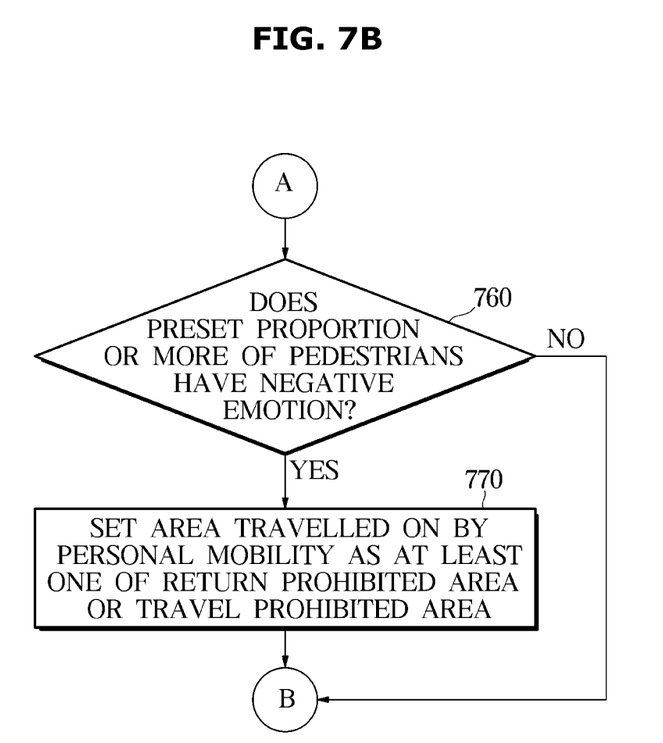

Hereinafter, a method of controlling the server 10 according to an exemplary embodiment will be described. The server 10 according to the above-described exemplary embodiment may be applied to the method of controlling the server 10 described below. Therefore, the description made above with reference to FIGS. 1 to 6 are applicable to the method of controlling the server 10 according to the exemplary embodiment unless otherwise mentioned. FIG. 7A and FIG. 7B are a flowchart showing a method of controlling the server 10, which shows an operation of adjusting the service area 500 according to an exemplary embodiment of the disclosure.

Referring to FIG. 7A and FIG. 7B, the server 10 according to the exemplary embodiment may be configured to receive image data from the personal mobility 20 (710), and determine the congestion level of an area on which the personal mobility 20 is traveling and the emotion information of pedestrians based on the image data (720). In other words, the server 10 may be configured to determine the congestion level of the area on which the personal mobility 20 is traveling and the emotion information of the pedestrians based on image processing on the image data received from the personal mobility 20.

In particular, the image data may include an image of the front of the personal mobility 20, and may be acquired using a camera provided in the personal mobility 20. In addition, the server may be configured to, in response to determining that the congestion level is greater than a preset reference value (YES in operation 730) and a preset proportion (a second proportion) or more of the pedestrians are determined to have a positive emotion based on the emotion information (YES in operation 740), expand the boundary of the service area 500 such that the area on which the personal mobility 20 is traveling is included in the service area 50 (750).

Particularly, the server 10 may be configured to set the area on which the personal mobility 20 is traveling as a recommended return area when the area on which the personal mobility 20 is traveling has been previously included in the service area. The controller 120 may be configured to update an application that provides a service based on location information of a recommended return area such that the location information of the recommended return area is provided to users of the personal mobility 20, and when the personal mobility 20 is returned to the recommended return area, provide a preset reward (e.g., points, etc.) to a user account corresponding to the user of the personal mobility 20.

In addition, the server 10 may be configured to, in response to determining that the congestion level is greater than the preset reference value (YES in operation 730) and a preset proportion (a third proportion) or more of the pedestrians are determined to have a negative emotion based on the emotion information (YES in operation 760), set the area on which the personal mobility 20 is traveling as at least one of a return prohibited area or a travel prohibited area (770). In particular, the controller 120 may be configured to update an application that provides a service based on location information of a return prohibited area or a travel prohibited area such that the location information of the return prohibited area or the travel prohibited area is provided to users of the personal mobility 20, and limit the return of the personal mobility 20 or the speed of the personal mobility 20 in the corresponding area. In other words, the controller 120 may be configured to limit the return or speed of the personal mobility 20 that has entered the corresponding area based on a GPS signal.

In addition, the server 10 may be configured to, in response to determining that the congestion level is less than a preset reference value (NO in operation 730) and a preset proportion (a first proportion) or more of the pedestrians are determined to have a negative emotion based on the emotion information (YES in operation 780), reduce the boundary of the service area 500 such that the area on which the personal mobility 20 is traveling is deleted from the service area 500 (790).

Figure 8:
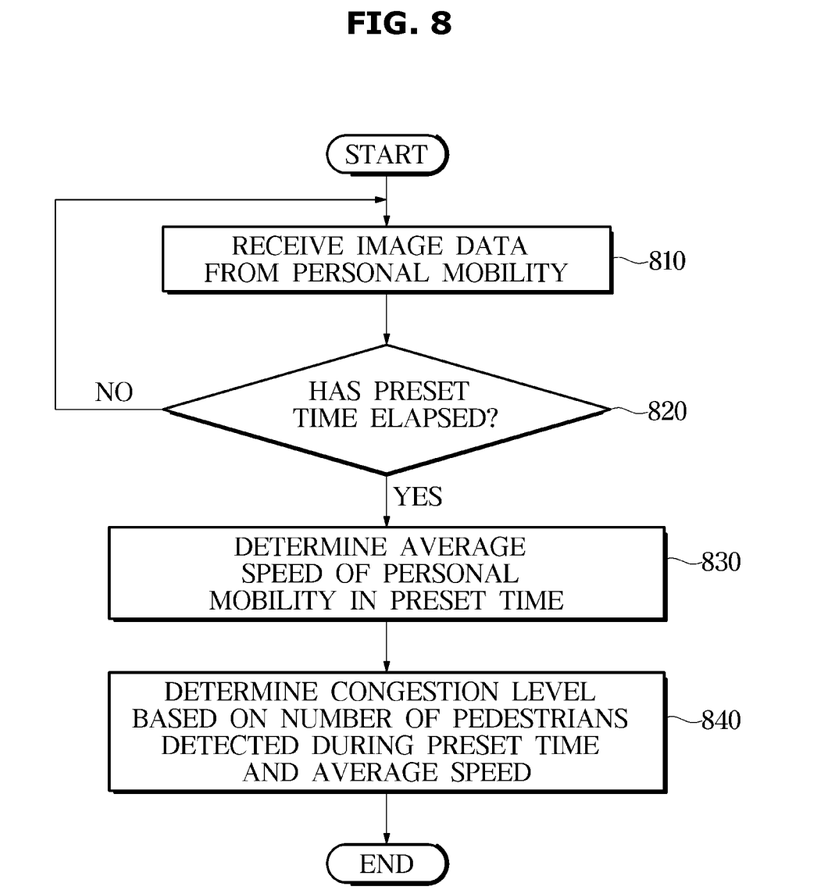
FIG. 8 is a flowchart showing a method of controlling a server according to an exemplary embodiment of the disclosure, which shows an operation of determining a congestion level.

FIG. 8 is a flowchart showing a method of controlling the server 10, which shows an operation of determining a congestion level according to an exemplary embodiment of the disclosure. Referring to FIG. 8, the server 10 according to the exemplary embodiment may be configured to receive image data from the personal mobility 20 (810). In particular, the server 10 may be configured to continue to receive the image data until a preset time elapses (YES in operation 820).

The server 10, when the preset time elapses (YES in operation 820), may be configured to determine the average speed of the personal mobility 20 in the preset time (830) and determine the congestion level based on the number of pedestrians detected during the preset time and the average speed (840). In other words, the server 10 according to an exemplary embodiment may be configured to determine the congestion level and the emotion information of the pedestrians at a preset time interval, and the server 10 may be configured to determine the congestion level based on the number of pedestrians detected during a preset time based on image data and the average speed of the personal mobility 20 in the preset time. In particular, the server 10 may be configured to detect pedestrians in image data by processing the image data based on generally known image processing algorithms (e.g., edge detection, etc.), and determine the congestion level that corresponds to the number of pedestrian per unit time by dividing the number of pedestrians detected during a preset time period by the average speed in the preset time period.

Figure 9:
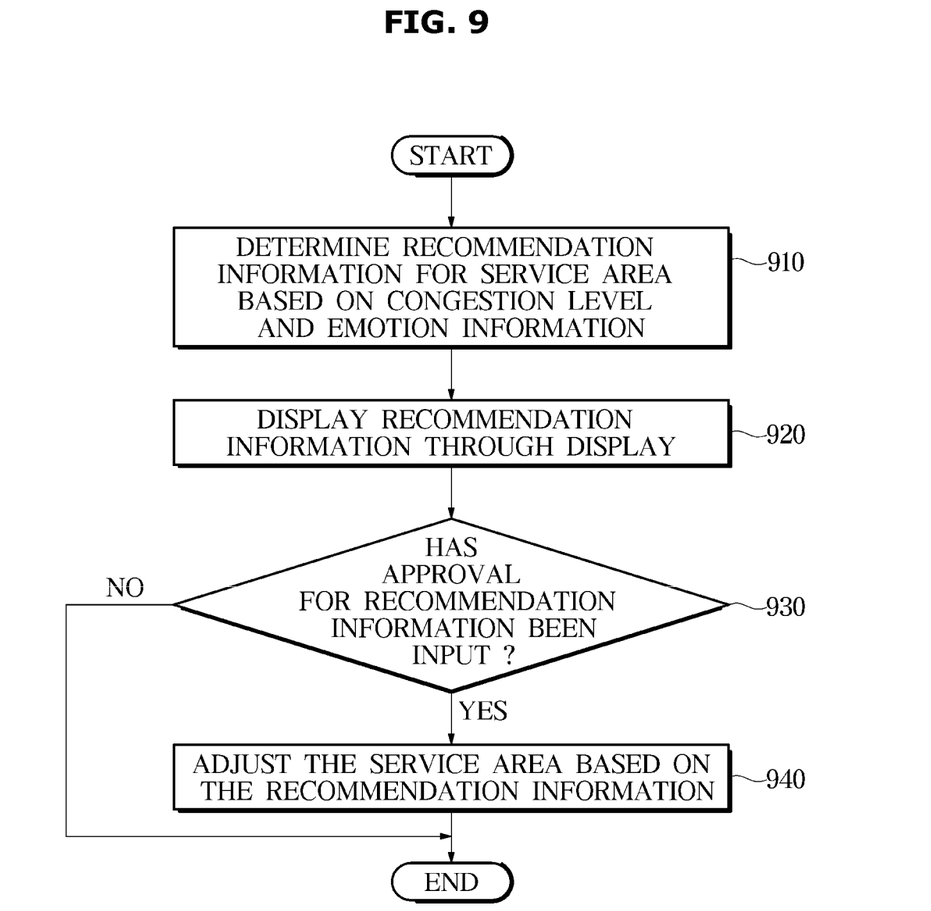
FIG. 9 is a flowchart showing a method of controlling a server according to an exemplary embodiment of the disclosure, which shows an operation of adjusting a service area by receiving an input related to recommendation information.

FIG. 9 is a flowchart showing a method of controlling the server 10 according to an exemplary embodiment, which shows an operation of adjusting the service area 500 by receiving an input related to recommendation information. Referring to FIG. 9, the server 10 according to the exemplary embodiment may be configured to determine recommendation information for the service area 500 based on the congestion level and the emotion information (910), and display the recommendation information through a display (920).

In particular, the recommendation information may include information for recommending adjustment of the existing service area, and may include recommendation content for deleting or including an area on which the personal mobility 20 is traveling from or into the service area. In addition, according to an exemplary embodiment, the recommendation information may include content for recommending an area on which the personal mobility 20 is traveling as at least one of a recommended return area, a return prohibited area, or a travel prohibited area. The recommendation information according to an exemplary embodiment may display the recommendation content as text, or display the recommendation content visually on a map. However, the display format of the recommendation information is not limited thereto, and may be variously provided as long as it is able to display the recommendation content to the user of the server 10.

The server 10 may be configured to, upon input of an approval for the recommendation information (YES in operation 930), adjust the service area based on the recommendation information (940). In particular, the recommendation information may include information for recommending adjustment to the existing service area, and may include recommendation content for deleting or including an area on which the personal mobility 20 is traveling from or in the service area. In addition, according to an exemplary embodiment, the recommendation information may include content for recommending an area on which the personal mobility 20 is traveling as at least one of a recommended return area, a return prohibited area, or a travel prohibited area.

The recommendation information according to an exemplary embodiment may display the recommendation content as text, or display the recommendation content visually on a map. However, the display format of the recommendation information is not limited thereto, and may be variously provided as long as it is able to display the recommendation content to the user of the server 10. When the approval for the recommendation information is input (YES in operation 930), the server 10 may be configured to adjust the service area based on the recommendation information (940).

Meanwhile, the disclosed exemplary embodiments may be embodied in the form of a recording medium storing instructions executable by a computer. The instructions may be stored in the form of program code and, when executed by a processor, may generate a program module to perform the operations of the disclosed exemplary embodiments. The recording medium may be embodied as a non-transitory computer-readable recording medium. The non-transitory computer-readable recording medium includes all types of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, according to the server and the method of controlling the same may determine a congestion level of a driving area and an emotion of a pedestrian in the driving area based on image data received from a personal mobility and adjust a service area based on the congestion level and the emotion of the pedestrian, so that the service area may be adaptively adjusted to satisfy not only consumers of personal mobility but also pedestrians.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A server, comprising:
 a communicator; and
 a controller configured to determine a number of pedestrians detected for a preset time based on image data received from a personal mobility, determine a congestion level of an area on which the personal mobility is traveling based on the number of pedestrians and an average speed of the personal mobility, and adjust a service area for the personal mobility based on the congestion level,
 wherein the controller is configured to determine emotion information of the pedestrian in the area on which the personal mobility is traveling based on the image data and adjust the service area based further on the emotion information of the pedestrian;
 wherein the controller is configured to set the area on which the personal mobility is traveling as at least one of a return prohibited area or a travel prohibited area when the congestion level is greater than a preset reference value and a third proportion or more of the pedestrians are determined to have a negative emotion based on the emotion information.

2. The server of claim 1, wherein the controller is configured to reduce a boundary of the service area such that the area on which the personal mobility is traveling is deleted from the service area when the congestion level is greater than or equal to a preset reference value.

3. The server of claim 1, wherein the controller is configured to expand a boundary of the service area such that the area on which the personal mobility is traveling is included in the service area when the congestion level is less than a preset reference value.

4. The server of claim 1, wherein the controller is configured to reduce a boundary of the service area such that the area on which the personal mobility is traveling is deleted from the service area when the congestion level is less than a preset reference value and a first proportion or more of the pedestrians are determined to have a negative emotion based on the emotion information.

5. The server of claim 1, wherein the controller is configured to expand a boundary of the service area such that the area on which the personal mobility is traveling is included in the service area when the congestion level is greater than a preset reference value and a second proportion or more of the pedestrians are determined to have a positive emotion based on the emotion information.

6. The server of claim 5, wherein the controller is configured to set the area on which the personal mobility is traveling as a recommended return area when the area on which the personal mobility is traveling has been previously included in the service area.

7. The server of claim 1, wherein the controller is configured to determine the emotion information based on a facial expression of the pedestrian of the image data.

8. The server of claim 1, wherein the server further includes a display, wherein the controller is configured to determine recommended information related to the service area based on the congestion level and the emotion information, and operate the display to display the recommendation information.

9. The server of claim 8, wherein the server further includes an inputter configured to receive an input from a user, wherein the controller is configured to adjust the service area based on the recommendation information upon receipt of an approval of the recommendation information that is input from the user.

10. A method of controlling a server including a communicator, comprising:

determining, by a controller, a number of pedestrians detected for a preset time based on image data received from a personal mobility;

determining, by the controller, a congestion level of an area on which the personal mobility is traveling based on the number of pedestrians and an average speed of the personal mobility, and emotion information of the pedestrian in the area on which the personal mobility is traveling based on the image data; and adjusting, by the controller, a service area for the personal mobility based on the congestion level and the emotion information, wherein the adjusting of the service area includes setting the area on which the personal mobility is traveling as at least one of a return prohibited area or a travel prohibited area when the congestion level is greater than a preset reference value and a third proportion or more of the pedestrians are determined to have a negative emotion based on the emotion information.

11. The method of claim 10, wherein the adjusting of the service area includes reducing a boundary of the service area such that the area on which the personal mobility is traveling is deleted from the service area when the congestion level is greater than or equal to a preset reference value.

12. The method of claim 10, wherein the adjusting of the service area includes expanding a boundary of the service area such that the area on which the personal mobility is traveling is included in the service area when the congestion level is less than a preset reference value.

13. The method of claim 10, wherein the adjusting of the service area includes reducing a boundary of the service area such that the area on which the personal mobility is traveling is deleted from the service area when the congestion level is less than a preset reference value and a first proportion or more of the pedestrians are determined to have a negative emotion based on the emotion information.

14. The method of claim 10, wherein the adjusting of the service area includes expanding a boundary of the service area such that the area on which the personal mobility is traveling is included in the service area when the congestion level is greater than a preset reference value and a second proportion or more of the pedestrians are determined to have a positive emotion based on the emotion information.

15. The method of claim 14, wherein the adjusting of the service area includes setting the area on which the personal mobility is traveling as a recommended return area when the area on which the personal mobility is traveling has been previously included in the service area.

16. The method of claim 10, wherein the determining of the emotion information includes determining the emotion information based on a facial expression of the pedestrian of the image data.

\* \* \* \* \*